United States Patent [19]

Ezawa

[11] Patent Number: 5,519,293

[45] Date of Patent: May 21, 1996

[54] LOAD DRIVING SYSTEM

[75] Inventor: Akira Ezawa, Kawasaki, Japan

[73] Assignee: Nikon Corporation, Tokyo, Japan

[21] Appl. No.: 350,613

[22] Filed: Dec. 7, 1994

[30] Foreign Application Priority Data

Dec. 7, 1993 [JP] Japan .................................. 5-306532

[51] Int. Cl.$^6$ .............................. H02P 1/00; H02P 3/00; H02P 5/00

[52] U.S. Cl. ........................ 318/139; 354/173.1; 74/413; 74/810.1; 475/12; 477/15

[58] Field of Search ........................... 354/173.1, 173.11; 310/96, 99; 74/336 R, 731.1, 732.1, 810.1, 413; 475/12; 477/7, 8, 15; 318/12, 139, 283–286

[56] References Cited

U.S. PATENT DOCUMENTS 4,647,169  3/1987  Suzuki et al. ........................ 354/173.1
4,655,724  4/1987  Law .................................. 74/810.1 X Primary Examiner—Howard B. Blankenship
Attorney, Agent, or Firm—Oliff & Berridge

[57] ABSTRACT

A load driving system uses two gear trains with different characteristics. The load driving system includes a motor, a first pinion gear which is installed on the output shaft of the motor, a first gear train transmitting the rotation from the first pinion gear to a load, a second pinion gear separate from the first pinion gear which is also mounted on the motor output shaft, a second gear train having different characteristics from the first gear train and transmitting the rotation from the second pinion gear to the load, a connector for connecting the first gear train to the load while separating the second gear train from the load and for connecting the second gear train to the load while separating the first gear train from the load, and a controller for selecting one of the first and second gear trains based on a battery discharge level. The first and second gear trains are selected by selecting a rotational direction of the motor.

21 Claims, 3 Drawing Sheets 5,519,293

LOAD DRIVING SYSTEM

BACKGROUND OF THE INVENTION

1. Field of Invention

This invention concerns a load driving system which can be used in a camera to wind a film or to charge the camera shutter mechanism.

2. Description of Related Art

A conventional load driving system, as described in published Japanese patent application 60-194433, provides two gear trains with different reduction ratios between a motor output shaft and a load. The motor is capable of rotating in a forward direction and a reverse direction. Either a first gear train or a second gear train is selected, based on the rotational direction of the motor. The first and second gear trains provide two sets of features best suited for two different situations. For example, the first gear train's reduction ratio is set to obtain a maximum output while the second gear train's reduction ratio is set to obtain a maximum efficiency. When a battery discharge level is low, the first gear train is selected by rotating the motor in the first direction to obtain the maximum output and to increase the driving speed of the load. When the battery discharge level is high, the second gear train is selected by rotating the motor in the reverse direction to obtain maximum efficiency.

A pinion gear is installed on the motor output shaft. This pinion gear is shared by the first and second gear trains. The rotation from the pinion gear is transmitted from the pinion gear to one of the first and second gear trains through a clutch. However, the clutch is powered by the motor through a third gear. This third gear is common to both the first and second gear trains. Since the third gear can have the features of only one of the sets of features of the first and second gear trains, the full benefit of having two gear trains is not achieved. Furthermore, in conventional load driving systems, the problem of gear motion noise is completely ignored.

SUMMARY OF THE INVENTION

This invention provides a load driving system which improves the benefit of using two gear trains in which motion noise is lowered and the lifetime of the battery is extended.

The load driving system comprises a motor, a first pinion gear and a second pinion gear. A first gear train and a second gear train couples the first and second pinion gears to a load through a connection means. The first gear train exhibits high transmission efficiency, while the second gear train exhibits low noise. The connection means connects either the first gear train or the second gear train to the load based on the rotational direction of the motor. A control means selects either the first or second gear train by setting the motor rotational direction based on a battery discharge level, an external temperature or an ambient noise.

In general, a gear train with small motion noise is disadvantageous from the point of view of transmission efficiency and transmission torque, while a gear train with high transmission efficiency and transmission torque is undesirable from the standpoint of motion noise. Accordingly, the second gear train having a lower motion noise level drives the load during the time when the discharge level of the battery is low and the first gear train drives the load, when the discharge level of the battery is high.

BRIEF DESCRIPTION OF THE DRAWINGS

This invention is described in conjunction with the following drawings, in which like reference numerals designate like elements, wherein.

DETAILED DESCRIPTION OF PREFERRED EMBODIMENTS

Figure 1:
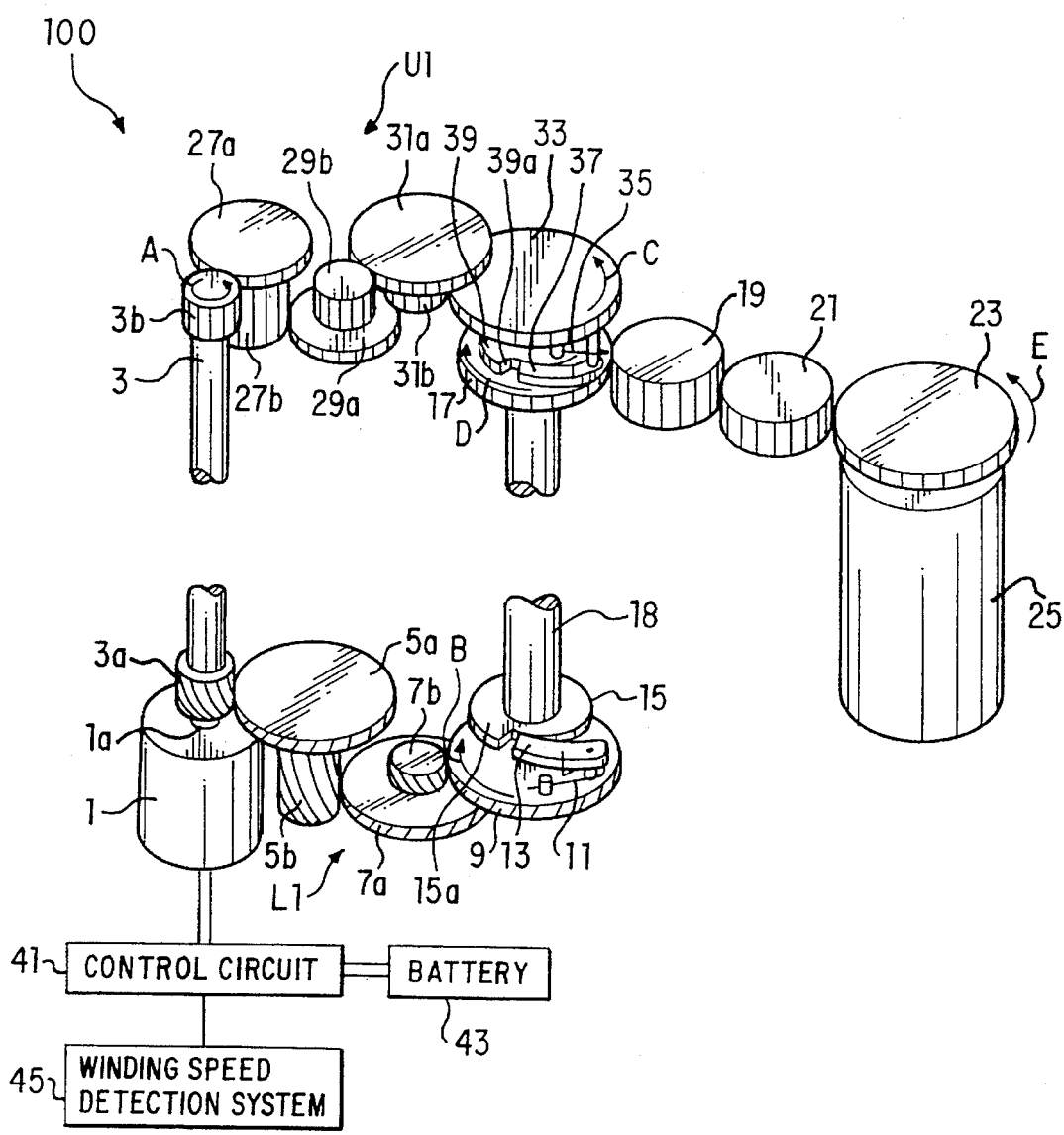
FIG. 1 shows a first preferred embodiment of the first and second gear trains.

FIG. 1 shows a first preferred embodiment of the driving system 100 of this invention. The driving system 100 comprises a motor 1. An upper gear train U1 and a lower gear train L1 are each connected at an upstream end to a pinion gear 3 attached to the motor I and at a downstream end to a subgear 17. The upper gear train U1 and the lower gear train L1 each transmit rotational power from the motor 1 through the subgear 17 and idle gears 19 and 21 to a spool gear 23. Thus, when the motor 1 is rotated, rotational motion is transmitted through either the upper gear train U1 or the lower gear train L1, the subgear 17, the idle gears 19 and 21 and the spool gear 23. The spool gear 23 and the winding spool 25 are attached to a common shaft, such that when the spool gear 23 is rotated, the winding spool 25 is also rotated.

The upper gear train U1 comprises gears 27, 29, 31 and 33. Each of the gears 27, 29 and 31 has a large diameter upstream gear portion 27a, 29a and 31a, respectively. Each of the gears 27, 29 and 31 also has a small diameter downstream gear portion 27b, 29b and 31b, respectively. In the upper gear train U1, the upstream portion 27a of the gear 27 is connected to a second portion 3b of the pinion gear 3 attached to the motor 1. The large upstream portion 29a of the gear 29 is connected to the downstream portion 27b of the gear 27. Likewise, the upstream portion 31a of the gear 31 is attached to the downstream portion 29b of the gear 29. Finally, the gear 33 is connected to the downstream portion of 31b of the gear 31.

Likewise, the lower gear train L1 comprises gears 5, 7 and 9. Each of the gears 5 and 7 comprises a large diameter upstream portion 5a and 7a, respectively, and a small diameter downstream portion 5b and 7b, respectively. The upstream portion 5a of gear 5 is connected to the first gear portion 3a of the pinion gear 3 attached to the motor 1. The upstream portion 7a of the gear 7 is attached to the downstream portion 5b of the gear 5. The gear 9 is connected to the downstream portion 7b of the gear 7. Thus, the gear ratios within and between the gears 27, 29, 31 and 33 of the upper gear train U1 and between the gears 5, 7 and 9 of the lower gear train L1 are arranged such that the rotational speed of each downstream gear is reduced relative to the rotational speed of each upstream gear.

All the gears comprising the lower gear train L1 are helical gears, while all the gears comprising the upper gear train U1 are flat gears. There is one more gear in the upper gear train U1 than the lower gear train L1 so that the gears 9 and 33 rotate in opposite directions for the same rotational direction of the output shaft 1a of the motor 1. Thus, when the output shaft 1a of motor 1 rotates in the direction A, the gear 9 rotates in the direction B while the gear 33 rotates in the direction C. Likewise, when the output shaft 1a of the motor 1 rotates in the direction $\overline{A}$, where $\overline{A}$ is the direction opposite A, the driving gear 9 rotates in the direction $\overline{B}$ while the driving gear 33 rotates in the direction $\overline{C}$. Hereinafter, the rotation of the output shaft 1a of the motor 1 in the direction A is referred to as the forward rotation, and the rotation in the direction $\overline{A}$ is referred to as the reverse rotation.

The downstream gears 9 and 33 of the lower gear train L1 and the upper gear train U1, respectively, are connectable to the subgear 17 through a pair of hook wheels 15 and 39. The hook wheels 15 and 39 and the subgear 17 are all fixedly mounted onto the same shaft 18. As shown in FIG. 1, the downstream gear 9 of the lower gear train L1 has a latch hook 13 and a spring 11 provided on its axially inwardly-facing surface. The spring 11 biases the latch hook 13 radially inwardly towards the rotational axis of the downstream gear 9. The hook wheel 15 is positioned adjacent to the downstream gear 9 of the lower gear train L1 such that the rotational axis of the shaft 18 is collinear with the rotational axis of the gear 9.

The hook wheel 15 has a notch 15a formed in it, which is engageable by the latch hook 13. Thus, when the motor I is driven in direction A, such that the driving gear 9 rotates in the direction B, the latch hook 13 engages with the notch 15a of the hook wheel 15 to drive the subgear 17 in the direction D. However, when the motor 1 rotates in the direction $\overline{A}$, the driving gear 9 rotates in the direction $\overline{B}$. In this case, since the latch hook 13 is unable to engage the notch 15a of the hook wheel 15, the subgear 17 is not rotated in either direction D or $\overline{D}$.

Like the gear 9 of the lower gear train L1, the downstream gear 33 of the upper gear train U1 is provided with a latch hook 37 and a spring 35 on its axially inwardly facing surface. The spring 35 biases the latch hook 37 radially inwardly towards the rotational axis of the downstream gear 33, which is collinear with the rotational axis of the shaft 18. The hook wheel 39 is positioned adjacent to the axially inwardly facing surface of the downstream gear 33 and has a notch 39a. When the motor 1 rotates in the direction A, the gear 33 rotates in the direction C. When the downstream gear 33 rotates in the direction C, the latch hook 37 is not able to engage with the notch 39a of the notch wheel 39. Thus, the subgear 17 is not rotated by the downstream gear 33 in either direction D or $\overline{D}$. However, when the motor 1 is rotated in the reverse direction $\overline{A}$, the downstream gear 33 of the upper gear train U1 rotates in the direction. Accordingly, the latch hook 37 now engages the notch 39a, causing the subgear 17 to rotate in the direction D. At the same time, while the subgear 17, and thus the hook wheel 15 is rotating in the direction C, the downstream gear 9 of the lower gear train L1 is rotating in the direction $\overline{B}$. Accordingly, the latch hook 13 of the lower gear train L1 does not engage with the hook wheel 15.

Thus, when the motor 1 is driven in the forward rotational direction A, the hook wheel 15 is engaged by the latch hook 13 of the lower gear train L1 and the subgear 17 is driven in the direction D. Alternately, when the motor I is driven in the reverse rotational direction $\overline{A}$, the hook wheel 39 is engaged by the latch hook 37 and the subgear 17 is again driven in the direction D. Thus, independently of which direction the motor 1 is driven, the subgear 17 always rotates in the direction D.

The rotational velocity of the subgear 17 is transmitted to the spool gear 23 through the idle gears 19 and 21. Since an even number of gears are used, the spool gear 23 rotates in the direction E, which is opposite to the rotational direction D of the subgear 17. The spool gear 23 and the winding spool 25 are fixedly attached to a common shaft. When the winding spool 25 is rotated in the direction E, a film strip (not shown) is wound onto the winding spool 25.

A control circuit 41 controls the rotational direction of the motor 1. The control circuit 41 comprises a microcomputer, peripherals and an internal memory which stores a previous winding speed $V_p$. The control circuit 41 changes the polarity of the power source supplied to the motor 1 from the battery 43 based on the previous winding speed $V_p$ of the film strip. The current winding speed $V_c$ is detected by the winding speed detection system 45.

Figure 2:
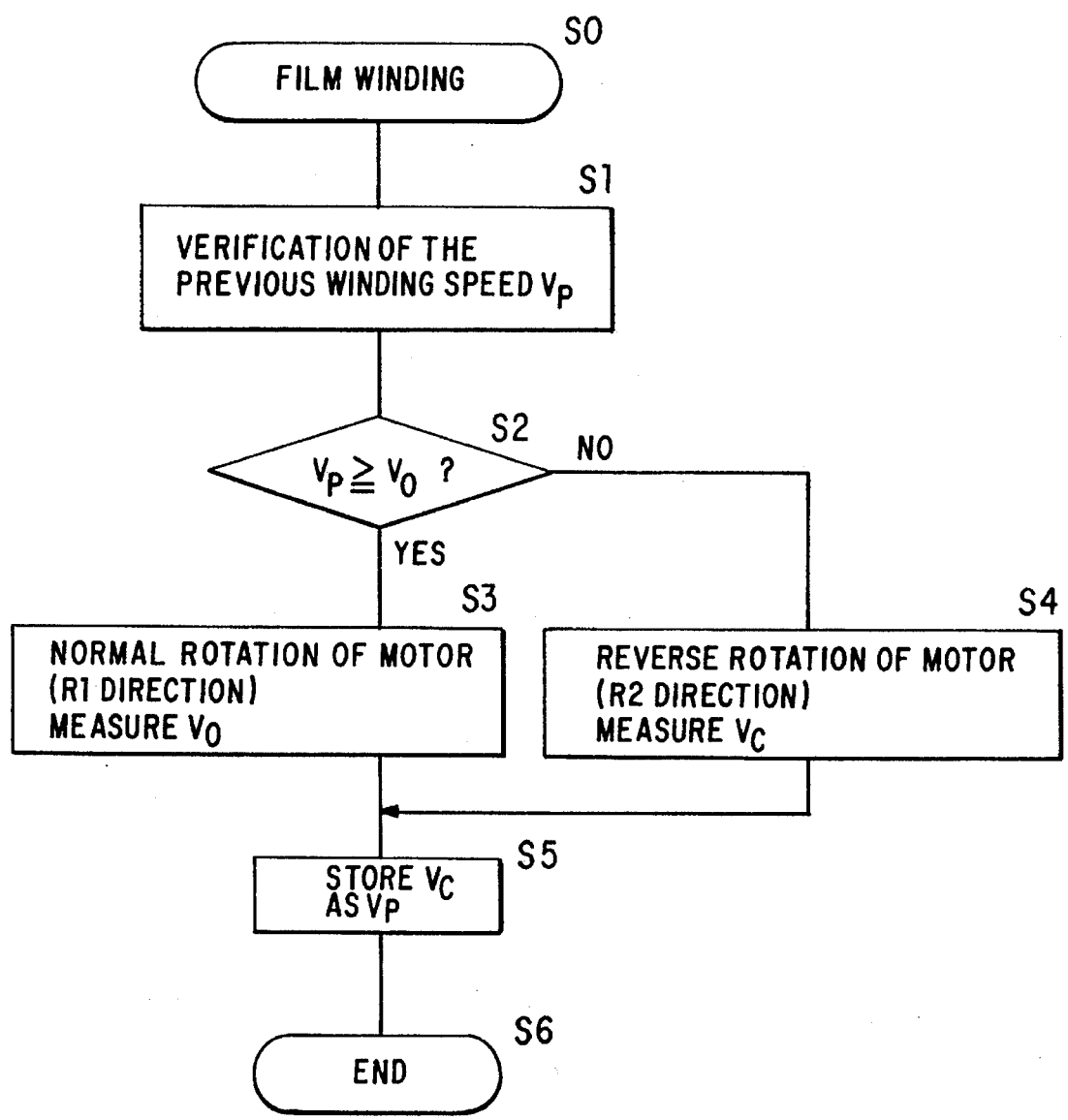
FIG. 2 is a flow chart of a first preferred embodiment of a film winding process.

FIG. 2 shows a flowchart of the film winding process of the control circuit 41. In step S0, a film winding start signal is generated in response to the completion of the exposure for one frame of the film. In step S1, a previous winding speed $V_p$ is verified. This verification ensures that $V_p$ is a valid value and not an erroneous value set by abnormal circumstances such as a power interruption. Then, in step S2, the previous winding speed $V_p$ is compared to a critical winding speed $V_o$. The critical winding speed $V_o$ depends on a discharge level of the battery 43. If the value of the previous winding speed $V_p$ exceeds the value of the critical winding speed $V_o$, control continues to step S3; otherwise, control jumps to step S4.

In step S3, the motor 1 is rotated in the forward direction A to scroll the film by one frame, while the current film winding speed $V_c$ is measured. Control then jumps to step S5. In contrast, in step S4, the motor 1 is rotated in the reverse direction A to scroll the film by one frame, while the current winding speed value $V_c$ is measured. Control then again continues to step S5. In step S5, the detected current winding speed $V_c$ is stored in the internal memory as the new previous winding speed $V_p$. Control then continues to step S6, which ends the film winding process.

With the above process, as long as the discharge level of the battery 43 of motor 1 is low (i.e., the battery charge level is high), the value of the previous winding speed $V_p$ will be higher than the value of the critical speed $V_o$ and control will continue from step S2 to step S3, such that the control circuit 41 rotates the motor 1 in the forward direction A. When the motor 1 rotates in the forward direction A, the gear 9 of the low-noise, helical lower gear train L1 rotates in the direction B and the gear 33 of the upper gear train U1 rotates in the direction C. The latch hook 13 engages the notch 15a of the hook wheel 15, while the latch hook 37 moves along the outer surface without engaging into the notch 39a of the hook wheel 39. This causes the rotation of the output shaft 1a of the motor 1 to be transmitted to the subgear 17 through the lower gear train L1. Subgear 17 drives the spool gear 23 through the idle gears 19 and 21 and causes the winding spool 25 to rotate in the direction E. The noise level during the rotation of the motor 1 in the forward direction A is kept low, because the lower gear train L1 is comprised of helical gears, which have lower levels of motion noise than the flat gears forming the upper gear train U1. The noise from the upper gear train U1 during free rotation is negligible. That is, when the gear train U1 rotates freely in a no load status, the force with which the teeth of the gears 27, 29, 31 and 33 encounter each other is weak, resulting in a nearly noiseless condition.

When the discharge level of the battery 43 rises (i.e., the charge level of the battery drops), the winding speed $V_p$ drops below the critical winding speed $V_o$. The control circuit 41 responds by jumping from step S2 to step S4, rather than continuing to step S3, causing the motor 1 to rotate in the reverse direction $\overline{A}$. When the motor 1 rotates in the reverse direction $\overline{A}$, the gear 9 of the lower gear train rotates in the direction $\overline{B}$ and the gear 33 of the upper gear train rotates in the direction $\overline{C}$. The latch hook 13 moves along the outer surface without engaging the notch 15*a* of the hook wheel 15, while the latch hook 37 engages the notch 39*a* of the hook wheel 39. Thus, the rotation of the output shaft 1*a* of the motor 1 is transmitted to the subgear 17 through the high-efficiency, flat upper gear train U1. The winding spool 25 again rotates in the direction E, safely winding the film, even at high battery discharge levels.

By switching from the lower gear train L1 to the upper gear train U1, the battery discharge rate is reduced, extending the lifespan of the battery 43. In addition, the high discharge level of the battery 43 is detected through an increase in the winding noise level of the upper gear train U1. The lower gear train L1 now rotates freely and causes only a small and negligible drop in transmission efficiency.

In this first preferred embodiment, the lower gear train L1 and the upper gear train U1 are switched according to changes in the previous winding speed $V_p$ corresponding to the discharge level of the battery. However, an externally operable switch can be provided on the camera to allow the operator to select the rotational direction of the motor 1. The switch allows the photographer to choose the gear train L1 or U1. In addition, the rapid discharge of the battery at low temperatures can be controlled by using only the upper gear train U1 when the temperature falls below a predetermined temperature (0 degrees Centigrade, for example) and preventing the user from choosing the lower gear train L1. Likewise, the ambient noise level of the area around the camera can be measured. When the ambient noise level falls below a predetermined value, only the lower gear train L1 is used so that the motion noise does not stand out. The user is prevented from selecting the upper gear train U1 under this condition.

Figure 3:
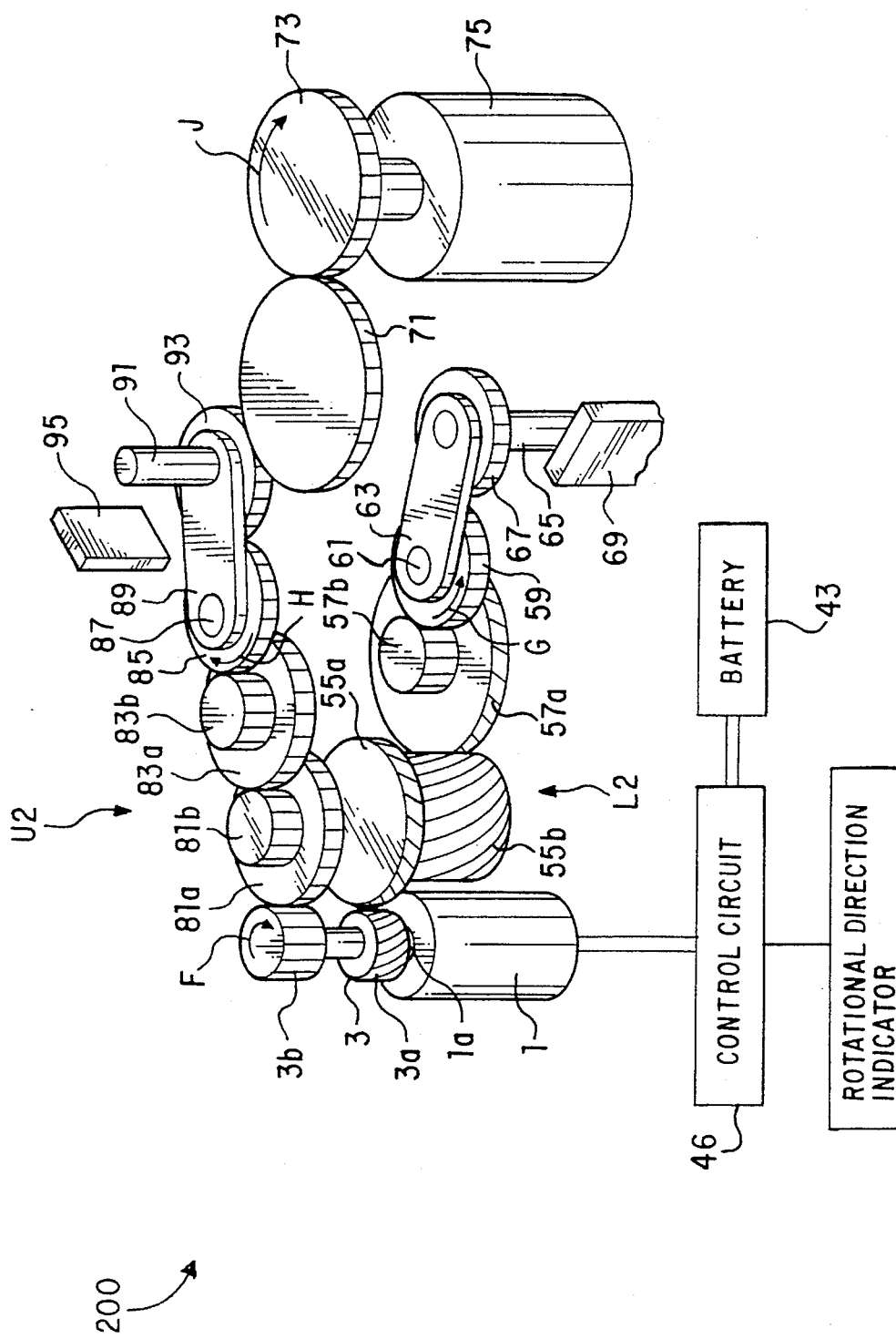
FIG. 3 shows a second preferred embodiment of the first and second gear trains.

FIG. 3 shows a second preferred embodiment of the load driving system 200. The components common to the first preferred embodiment are identified with the same symbols. In the first preferred embodiment, the rotational direction of the winding spool 25 does not change with the selection of the lower or the upper gear trains L1 or U1. However, in the second preferred embodiment, the rotational direction of the load shaft 75 changes with the gear train selection.

As shown in FIG. 3, the second preferred embodiment comprises a motor 1. An upper gear train U2 and a lower gear train L2 are each connected at the upstream end to a pinion gear 3 and at a downstream end to a subgear 71. The pinion gear 3 is attached to the output shaft 1*a* of the motor 1. The upper gear train U2 and the lower gear train L2 each transmit rotational power from the motor 1 through the subgear 71 to a load shaft gear 73. Thus, when the motor 1 is rotated, rotational motion is transmitted through either the upper gear train U2 or the lower gear train L2 to the subgear 71 and the load shaft gear 73. The load shaft gear 73 and the load shaft 75 are attached to a common shaft, such that when the load shaft gear 73 is rotated, the load shaft 75 is also rotated in the same direction.

The upper gear train U2 comprises gears 81, 83, 85 and 93. The gears 81 and 83 have a large diameter upstream gear portions 81*a* and 83*a*, respectively. The gears 81 and 83 also have a small diameter downstream gear portions 81*b* and 83*b*, respectively. The upstream gear portion 81*a* of the gear 81 is connected to a second gear portion 3*b* of the pinion gear 3. The downstream gear portion 81*b* of the gear 81 connects to the upstream gear portion 83*a* of the gear 83. The downstream gear portion 83*b* of the gear 83 connects to the sun gear 85. The sun gear is connected to the planetary gear 93. The sun gear 85 and the planetary gear 93 are both installed on a connection board 89. The reduction ratios within and between the gears 81, 83 and 85 of the upper gear train U2 are arranged such that the rotational speed of each downstream gear is reduced relative to the rotational speed of each upstream gear. The reduction ratio from the sun gear 85 to the planetary gear 93 is 1.

Likewise, the lower gear train L2 comprises gears 55, 57, 59 and 67. The gears 55 and 57 have a large diameter upstream gear portions 55*a* and 57*a*, respectively. The gears 55 and 57 also have small diameter downstream gear portions 55*b* and 57*b*, respectively. The upstream gear portion 55*a* of the gear 55 is connected to a first gear portion 3*a* of the pinion gear 3. The downstream gear portion 55*b* of the gear 55 is connected to the upstream gear portion 57*a* of the gear 57. The downstream gear portion 57*b* is connected to the sun gear 59. The sun gear 59 is connected to the planetary gear 67. The sun gear 59 and the planetary gear 67 are both mounted on a connection board 63. The reduction ratios within and between the gears 55, 57 and 59 of the lower gear train L2 are arranged such that the rotational speed of each downstream gear is reduced relative to the rotational speed of each upstream gear. The reduction ratio from the sun gear 59 to the planetary gear 67 is 1.

The gears of the lower gear train L2 from the first gear portion 3*a* of the pinion gear 3 through the large diameter upstream gear portion 57*a* of the gear 57 are helical gears, while the gears from the small diameter gear portion 57*b* of the gear 57 through the planetary gear 67 are flat gears. All the gears in the upper gear train U2 are flat gears. The planetary gears 67 and 93 are connected through connection boards 63 and 89 to the central axis 61 and 87 of the sun gears 59 and 85, respectively. The planetary gears 67 and 93 mesh with the sun gears 59 and 85, respectively.

Board springs, not shown in the drawing, are installed between the connection boards 63 and 89 and the sun gears 59 and 85, respectively. Due to the frictional force corresponding to each of these board springs, the connection boards 63 and 89 move in the same direction as the rotational direction of the sun gears 59 and 85.

The upper and lower gear trains U2 and L2 have the same number of gears. Thus, the sun gears rotate in the same direction. However, since the sun gear 59 and 84 are located on opposite sides of the subgear 71, the connection boards 63 and 89 move in opposite directions relative to the subgear 71. Accordingly, for a rotational direction of motor 1, one of the connection boards 63 or 89 will be moved closer to the subgear 71 causing the corresponding planetary gear to connect with the subgear 71. A change in the rotational direction of the motor 1 causes the other of the connection boards 63 or 89 to be moved closer to the subgear 71 and thus causes a switch in the engagement of the planetary gears 67 and 93 with subgear 71.

The central axis 65 and 91 of the planetary gears 67 and 93 are extended downward and upward, coming in contact with constraint boards 69 and 95, respectively. The constraint boards 69 and 95 control the movement of connection boards 63 and 89 away from the planetary gears 67 and 93, respectively. The rotation of the subgear 71 is transmitted to the load shaft gear 73. The load shaft 75 is driven by the rotation of load shaft gear 73 in the direction J.

When the output shaft 1*a* of the motor 1 rotates in the forward direction F, the sun gear 59 rotates in the direction G. When the sun gear 59 rotates in the direction G, the planetary gear 67 is brought in contact with subgear 71 by the rotation of the connection board 63 due to the frictional forces on the axis 61 while the connection board 89 rotates away from the subgear 71 disconnecting the planetary gear 93 from the subgear 91. When the planetary gear 67 engages the subgear 71, the load shaft gear 73 and the load shaft 75 rotates in the direction J. When the output shaft 1a of the motor 1 rotates in the reverse direction F̄, where F̄ is the direction opposite F, then the sun gear 59 rotates in the direction Ḡ. When this occurs the connection board 63 rotates in the same direction Ḡ as the sun gear 59, thus swinging the planetary gear 67 away from the subgear 71, disconnecting the planetary gear from the sub gear 71.

When the output shaft 1a of the motor 1 rotates in the direction F̄, the sun gear 85 rotates in the direction H. When the sun gear 85 rotates in the direction H, the connection board 89 swings the planetary gear 93 into contact with subgear 71 so that the rotational power from the output shaft 1a of the motor 1 is transferred to the subgear 71 through the planetary gear 93. When the planetary gear 93 connects subgear 71 the load shaft gear 73 and the load shaft 75 rotate in the direction J. Accordingly, based on the rotational direction of the output shaft 1a of the motor 1 either the upper gear train U2 or the lower gear train L2 is connected with the subgear 71 transmitting the rotational power from the motor to the load shaft 75.

In the second preferred embodiment, when the motor 1 rotates in the forward direction F, the planetary gear 67 in the lower gear train L2 meshes with the subgear 71, while the planetary gear 93 in the upper gear train U2 separates from the subgear 71. The rotation of the motor 1 is transmitted to the subgear 71 through the lower gear train L2 and rotating the load shaft 75 in the direction J. The noise level is held to a minimum during the rotation of the motor 1 in the forward direction F, because the gears from the lower pinion gear 3a through the large diameter gear portion 57a of gear 57 in the lower gear train L2 are made of helical gears. The noise from the upper gear train U2 is negligible because the upper gear train U2 is rotating freely without any load.

When the motor rotates in the direction F̄, the planetary gear 67 in the lower gear train L2 separates from the subgear 71, while the planetary gear 93 in the upper gear train U2 meshes with the subgear 71. The rotation of the motor 1 is transmitted to the subgear 71 through the upper gear train U2 rotating the load shaft 75 in the direction J. A high level of transmission efficiency is obtained when the motor 1 rotates in the reverse direction F̄, because the gears in the upper gear train U2 are made of flat gears. The lower gear train L2 does not cause loss of transmission efficiency, because it rotates freely without load. Thus, this second preferred embodiment is well suited for applications which require low noise levels only during rotation in one direction.

Motor 1 is connected to the control circuit 46 which is comprised of microcomputers and peripherals. The control circuit 46 switches the rotational direction of the motor 1 between the forward direction F and the reverse direction F̄, by changing the polarity of the power source current from the battery 43. The control circuit 46 switches the motor rotational direction based on the motor rotational direction instruction signal produced by the rotational direction indicator 47. In this case, the rotational direction indicator 47 can produce either the instruction signals according to the operation of the photographer or the instruction signals according to the control status of the camera.

It is appreciated that resin gears can be used to reduce noise instead of helical gears for at least a portion of the lower gear trains L1 and L2 of the first and second embodiments, respectively. The resin gears exhibit a low transmission torque but a high noise reduction effect. Thus, resin gears can be used to differentiate the gear train that requires a low level of noise from the gear train that requires a high transmission torque.

The two gear trains U1 and L1, or U2 or L2, can be provided with different reduction ratios. In addition, a multiplication ratio component can be provided in the gear trains 17–25 and 71–75 of the first and second embodiments, respectively, rather than in the pinion gears 3a or 3b. When the rotational velocity of some gears in a gear train becomes very high, the gear train can be separated into two gear trains with different motion noise. The gears with the highest rotational velocity can be kept in one train, sharing the pinion gear 3a or 3b. A similar process can be applied to an application where a series of gears in the gear train has a high noise level without a multiplication component.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A load driving system, comprising:
   a motor;
   a first pinion gear mounted on a shaft of the motor;
   a first gear train of a plurality of gear trains coupling the first pinion gear with a load;
   a second pinion gear mounted on the shaft of the motor;
   a second gear train of the plurality of gear trains coupling the second pinion gear with the load;
   connecting means for connecting one of the plurality of gear trains to the load; and
   control means for selecting one of the plurality of gear trains.

2. The load driving system of claim 1, wherein the motor rotates in a first direction and a second direction.

3. The load driving system of claim 1, wherein the first gear train has high transmission efficiency and the second gear train has low rotational noise.

4. The load driving system of claim 2, wherein the connecting means connects the first gear train to the load when the motor rotates in a first direction and the second gear train to the load when the motor rotates in a second direction.

5. The load driving system of claim 4, wherein the connecting means separates the second gear train from the load when the first gear is connected to the load and separates the first gear train from the load when the second gear is connected to the load.

6. The load driving system of claim 4, wherein the control means selects the first gear train by rotating the motor in the first direction and the second gear train by rotating the motor in the second direction.

7. The load driving system of claim 6, further comprising a battery for supplying power to drive the motor, wherein the control means selects the first gear train when a battery discharge level is at least a predetermined value and the second gear train when the battery discharge level is below the predetermined value.

8. The load driving system of claim 6, wherein the control means selects the first gear train when a temperature is below a predetermined temperature value.

9. The load driving system of claim 6, wherein the control means selects the second gear train when an ambient noise level is below a predetermined noise value.

10. The load driving system of claim 1, wherein the second gear train has motion noise during the connection with the load that is less than the motion noise of the first gear train when connected to the load.

11. The load driving system of claim 10, wherein:

the first gear train is comprised of flat gears, a portion of the second gear train is comprised of helical gears, and the second pinion gear is a helical gear.

12. The load driving system of claim 10, wherein at least a portion of the second gear train is made of a first material and the first gear train is made of a second material, wherein the first material has a better noise elimination effect than the second material.

13. A load driving system, comprising:

a motor;

a first pinion gear installed on a shaft of the motor;

a first gear train for coupling the first pinion gear to a load;

a second pinion gear installed on the shaft of the motor;

a second gear train for coupling the second pinion gear to the load; and gear train connecting means for connecting the first gear train to the load while the motor is rotating in a first direction and connecting the second gear train to the load while the motor is rotating in a second direction, wherein the second gear train is separated from the load when the first gear train is connected to the load and the first gear train is separated from the load when the second gear train is connected to the load.

14. The load driving system of claim 13, wherein the second gear train has lower motion noise when connected to the load than the first gear train when connected to the load.

15. The load driving system of claim 13, wherein the first gear train is comprised of flat gears and at least a portion of the second gear train is comprised of helical gears.

16. The load driving system of claim 13, wherein at least a portion of the second gear train is made of a first material, the first gear train is made of a second material, and the first material having a better noise elimination effect than the second material.

17. The load driving system of claim 13, wherein the load driving system further comprises:

a battery;

battery discharge level detection means for detecting a discharge level of the battery; and motor control means for causing the motor to rotate in the first direction when the battery discharge level is at least a predetermined value and in the second direction when the battery discharge level is below the predetermined value.

18. A method for driving a load using a motor having first and second rotational directions, and a first pinion gear and a second pinion gear provided on a shaft of the motor, a first gear train having high transmission efficiency and a second gear train having low noise coupling the first and second pinion gears to a load, respectively, the method comprising the steps of:

powering the motor using a battery;

detecting a discharge level of the battery; and selecting one of the first and second gear trains based on the discharge level of the battery.

19. The method of claim 18, wherein the connecting step comprises:

separating the second gear train from the load when the first gear train is connected to the load; and separating the first gear train from the load when the second gear train is connected to the load.

20. The method of claim 18, wherein the selecting step further comprises the steps of:

comparing a previous driving speed of the motor with a specified value corresponding to the predetermined value;

selecting the first gear train when the previous driving speed of the motor is below a predetermined value and the second gear train when the previous driving speed of the motor is at least the predetermined value;

measuring a new driving speed of the motor;

storing the measured new driving speed in a memory device as the previous driving speed.

21. The method of claim 20, wherein the selecting step further comprises:

rotating the motor in a first direction when the previous driving speed is below a predetermined value to select the first gear train;

rotating the motor in a second direction when the previous driving speed is at least the predetermined value to select the second gear train.

* * * * *